United States Patent Office 2,872,985
Patented Feb. 10, 1959

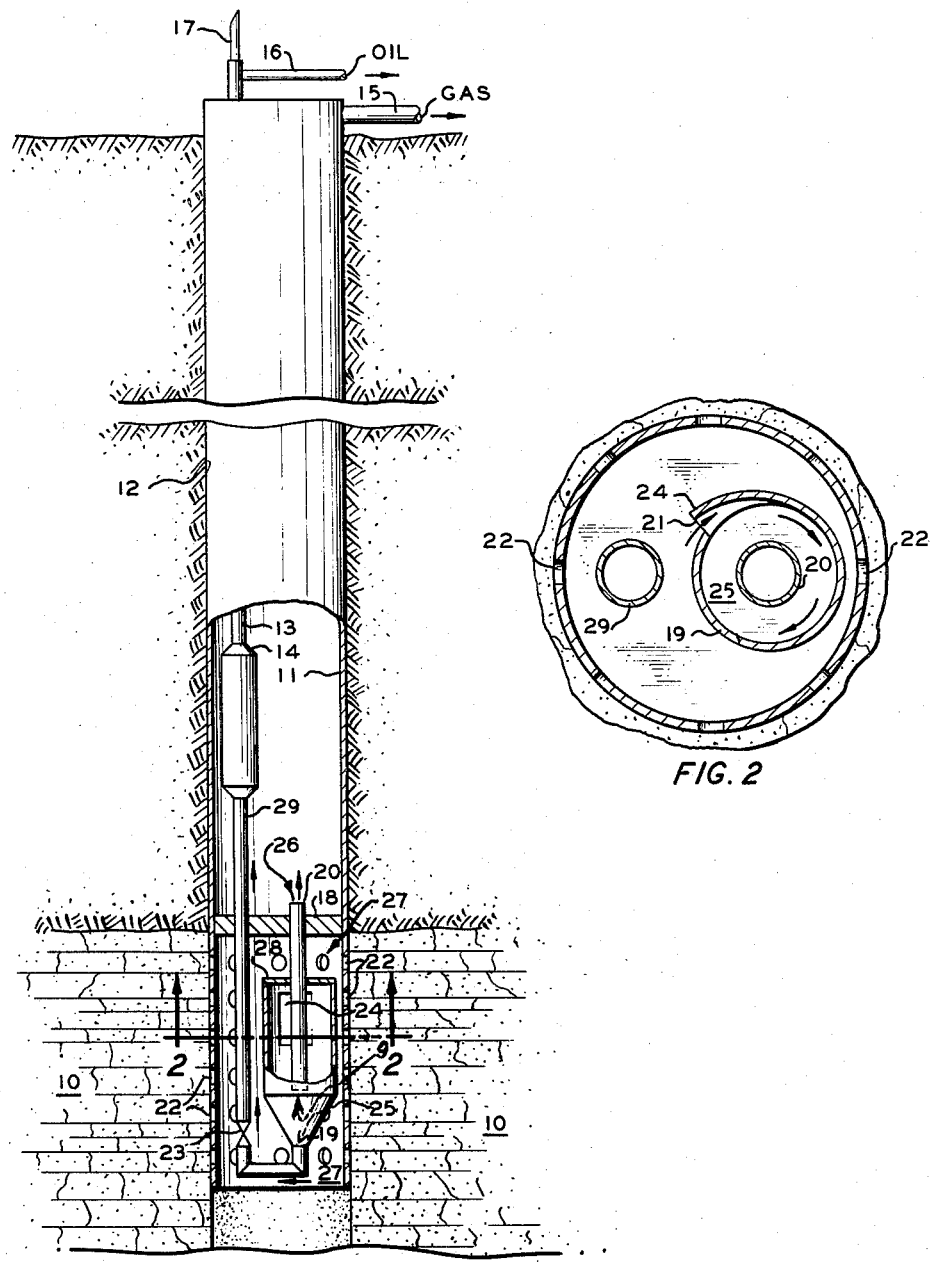

2,872,985

CYCLONE GAS ANCHOR

Andrew F. Bertuzzi and Mehmet R. Tek, Bartlesville, Okla., assignors to Phillips Petroleum Company, a corporation of Delaware Application December 26, 1956, Serial No. 630,678

5 Claims. (Cl. 166—243)

This invention relates to gas anchors. In one aspect this invention relates to gas anchors involving the use of cyclone separators. In another aspect it relates to a cyclone gas anchor apparatus in which to develop an acceleration or separating force several times greater than that which is obtained in the usual gas anchor.

One form of gas anchor in common use consists of two concentric tubes with the lower end of the outer tube capped at the bottom. The two tubes are attached to and are supported by the lower end of an oil pump. The gas and oil enter the outer tubing near its top, are directed downward with the oil separating from gas in its downward path and by any centrifugal force which occurs as the fluid changes direction from downward to upward on entering the center tubing. The upper end of the center tubing is attached to the pump inlet. Gases separated from the oil are passed through holes in the outer tubing adjacent the pump and flow upward in the well between the casing and tubing to an outlet at the casing head.

Gas anchors are important in removing gas from the oil because free gas entering the pump causes a loss in efficiency of the pump for pumping oil. Slugs of gas entrained in the liquid do not permit the pump and its valves to operate properly.

An object of this invention is to provide a gas anchor which effectively separates free gas from oil prior to entry of the latter into the production pump.

Another object of this invention is to provide a gas anchor which is simple and inexpensive to manufacture, to install and to operate.

These and other objects and advantages of our invention will be realized upon reading the following description which, taken with the attached drawing, forms a part of this specification.

In the drawing:

Figure 1 illustrates, in diagrammatic form, a preferred embodiment of our invention.

Figure 2 is a sectional view taken along the line 2—2 of Figure 1.

Our invention makes use of a cyclone separator below a packer at the bottom of a well producing oil and gas. The packer is located below a conventional oil pump. The fluid as produced, that is, containing oil and free-gas as well as solution gas, enters our cyclone separator tangentially thus providing increased acceleration and thus forces several times greater than gravity cause separation of the oil from the free-gas. Since the oil has greater density than the free-gas it flows from the separator by way of its apex while the gas escapes by way of a tube through the top of the separator and is passed on to the upper side of the packer. The gas discharged through this tube to the upper side of the packer flows up the annular space between the pump tubing and the well casing to the gas outlet or outlets at the casing head. If desired, a check valve is used in the pipe connection between the apex of the cyclone separator and the pump suction to prevent backing up of oil from the pump into the cyclone separator. Small diameter cyclone separators are available in commerce, that is, separators of two or three inches in diameter, and such cyclone separators are used in the practice of our invention. Such separators can be used because the diameter of well casings at the bottom of wells are usually 6 inches or larger. A six-inch diameter or larger casing easily accommodates a two or three inch diameter cyclone separator and a small diameter tubing leading from the apex of the separator upward to the suction of the oil lifting pump.

Our invention is specifically directed to an apparatus comprising, in combination, a well packer, an oil production tubing extending operatively through said packer, a cyclone separator, said cyclone separator having its apex end pointing away from said packer, the separator at its apex end being in fluid communication with said production tubing, and a vent tube communicating the central portion of said separator with a space on the side of said packer opposite said separator.

Furthermore, our invention comprises a method for producing oil free from at least a portion of its production gas from a free gas-oil mixture in a well penetrating a gas and oil bearing formation comprising the steps of injecting said free gas-oil mixture into a cyclone separating zone in said well under cyclone separating conditions, withdrawing separated free gas and separated oil separately from said separating zone, and producing said separated free gas as one product, and pumping the separated oil to the well head as the main product of the operation.

In the drawing, a well bore 12 is provided with a casing 11 containing perforations 22 adjacent an oil and gas bearing formation 10. A packer 18 is set in the casing, as shown, and through the packer extends tubes 20 and 29. A cyclone separator apparatus 19 is disposed, as shown, at a level somewhat below that of packer 18. Tube 20 extends through packer 18 into the separator as shown. A flange 24 provides an opening in the side wall of the cyclone separator so that fluids passing through opening 21 enter the cyclone separator in a direction substantially tangent to its inner wall. The lower end of tube 20, for reasons well known in the cyclone separation art, extends to a small distance below the lower edge of flange 24. The apex of the cyclone separator is connected with a tubing 29, as shown, which leads to the suction end of a pump 14. Above pump 14 is provided a production tubing 13 which leads to the well head. In case pump 14 is a reciprocating pump, a pump rod 17 extends through the production tubing from the well head to the reciprocating member or members of the pump. Pipe 16 is for outlet of production oil from the well head. Pipe 15 is for outlet of gas from the well head end of the annulus between the production tubing 13 in the case 11. If desired, a check valve 23 is inserted in tubing 29 as shown to make certain that oil from the pump does not backflow into the cyclone separator.

The top of the cyclone separator of course is closed with a cover plate 28.

In operation of this cyclone gas anchor oil and free gas enter the cyclone separator through opening 21, see Figure 2, in a direction tangent to the inner wall of the separator. On traveling at a high velocity in a circular direction oil is thrown outward while gas separates in the central portion of the separator. The oil freed from free gas is illustrated by reference numeral 25 and this oil free of free gas is withdrawn from the bottom of the separator 19 and flows through tubing 29 to the pump 14. Gas 9 separated from the oil enters the lower end of tube 20 and is conducted by this tube to the upper side of packer 18. The gas issuing from tube 20 is identified in the drawing by reference numeral 26. Reference numeral 27 identifies the oil-free gas mixture entering the casing through perforation 22 below packer 18.

Our cyclone gas anchor has special application in wells in which there exists a reasonably high bottom hole pressure, that is, pressures appreciably greater than for example 100 pounds per square inch. A well having a bottom hole pressure of the order of about 2000 pounds per square inch is particularly suited for use of our gas anchor. There is obviously some pressure drop experienced by the oil and gas passing through our cyclone separator and in a well having a bottom hole pressure of about 2000 pounds per square inch the pressure loss on passing through the separator is of the order of about 100 pounds per square inch. A pressure drop of this order in a well having such a bottom hole pressure can be tolerated without undue adverse effect on pumping operations.

While bottom hole pressures of 2000 pounds and 100 pounds were mentioned, we do not wish to limit our invention to use in wells having only this pressure because our gas anchor can be used in wells having higher and lower bottom hole pressures. Sufficient pressure is necessary to force the well fluid into the cyclone separator at sufficient velocity that the centrifugal force in the separator is ample to produce effective oil-free gas separation.

While we have disclosed our invention when using a single cyclone separator it will be obvious to those skilled in the art that at any time the diameter of the well casing at the level of the gas anchor is sufficiently great two or more cyclone separators can be installed to operate in parallel for separating free gas from the oil. In this case the apexes of the several separators are manifolded to the lower end of tubing 29 below check valve 23.

Furthermore, when desired, two or more cyclone separators can be installed to operate in series for effectively increasing the separation of free gas from the oil. In this case the outlet from the apex of one separator is directed to the inlet of the next lower separator in such a manner that the oil is directed to the inlet of the next lower separator in such a manner that the oil is exposed to several separations in series for effecting a more nearly complete separation of free gas from the oil before passage of the oil to the suction of the pump. In this case each tube for venting gas from a specific separator is extended upward and through the packer to the gas containing space thereabove.

Materials of construction of the apparatus of our invention are in general those commercially available. However, consideration is given to the corrosive nature of the gas or oil being separated.

While certain embodiments of the invention have been described for illustrative purposes, the invention obviously is not limited thereto.

We claim:

1. An apparatus comprising, in combination, a well packer, an oil production tubing extending operatively through said packer, a cyclone separator disposed below said packer, said cyclone separator having an apex pointing away from said packer, the separator at its apex being in fluid communication with said production tubing, and a vent tube communicating the central portion of said separator with a space on the side of said packer opposite said separator.

2. An oil and gas separator for use in an oil well producing oil and gas comprising, in combination, a packer adapted to be inserted into a casing of an oil well, an oil production tubing extending operatively through said packer, a cyclone separator below said packer, said separator having an apex pointing away from said packer, said apex being attached to said production tubing for passage of liquid, the end of said separator adjacent said packer being closed, a vent tubing communicating the central portion of said separator with a space on the side of said packer opposite said separator, and an opening in the side wall of said separator for inlet of oil and gas to be separated, the axis of said opening being substantially tangent to the inner wall surface of said separator.

3. A gas anchor assembly comprising, in combination, a packer disposed in an oil well casing in a well at a level adjacent and above the top of an oil-gas bearing formation, a production tubing extending through said packer and to the well head, a pump in said tubing above said packer for lifting oil to the well head, a cyclone separator below said packer, said separator having an upper vertical side wall of circular cross section and a lower inverted conical section, said conical section having its apex pointing downward, said tubing at a level below said packer being connected with said apex for passage of liquid from said apex, the upper end of said separator being closed, a tube communicating the central portion of said separator with the space in said well above said packer, and an inlet in the vertical side wall of said separator for inlet of oil and gas to be separated, said inlet being adapted to direct the inlet flow of oil and gas substantially tangentially to the inner surface of said vertical side wall.

4. In the gas anchor assembly of claim 3, a check valve disposed in said production tubing at a level adjacent said separator, said check valve being adapted to pass fluid only in the direction from said separator to said pump.

5. An oil-gas separating assembly comprising, in combination, a well casing disposed operatively in a gas-oil production well, said casing having perforations adjacent a gas-oil producing formation, a packer disposed operatively in said casing adjacent and above said perforations, a production tubing extending through said packer and to the well head, a pump in said tubing above and near said packer for lifting oil to the well head, a cyclone separator below said packer, said separator having an upper vertical side wall of circular cross section and a lower inverted conical section, said conical section having its apex pointing downward, said tubing at a level below said packer being connected in fluid communication only with said separator at its apex, the upper end of said separator being closed, a tube communicating the central portion of said separator with the space in said well above said packer, and an opening in said side wall for inlet of fluid, a flange plate having a radius greater than the radius of said side wall attached at one side to said side wall at one vertical side of said opening in such a manner that fluid entering said cyclone separator through said opening does so in a direction substantially tangential to the inner wall surface of said vertical side wall.

References Cited in the file of this patent

UNITED STATES PATENTS 2,652,130   Ferguson _____ Sept. 15, 1953